United States Patent [19]

Yasuda

[11] Patent Number: 5,611,061

[45] Date of Patent: Mar. 11, 1997

[54] METHOD AND PROCESSOR FOR RELIABLY PROCESSING INTERRUPT DEMANDS IN A PIPELINE PROCESSOR

[75] Inventor: Hiroyuki Yasuda, Tokyo, Japan

[73] Assignee: Sony Corporation, Tokyo, Japan

[21] Appl. No.: 158,190

[22] Filed: Nov. 24, 1993

Related U.S. Application Data

[63] Continuation of Ser. No. 706,936, May 29, 1991, abandoned.

[30] Foreign Application Priority Data

Jun. 1, 1990 [JP] Japan ................................. 2-143883

[51] Int. Cl.⁶ ............................................... G06F 9/00
[52] U.S. Cl. ................... 395/591; 364/231.8; 364/247.4; 364/247.7; 364/961.3; 364/263.2; 364/DIG. 1
[58] Field of Search ................................... 395/400, 425, 395/375

[56] References Cited

U.S. PATENT DOCUMENTS

| 4,398,244 | 8/1983 | Chu et al. ........................ 395/375 |
| 4,399,507 | 8/1983 | Cosgrove et al. ................. 395/375 |
| 4,438,492 | 3/1984 | Harmon, Jr. et al. ............. 395/375 |
| 4,488,227 | 12/1984 | Miu et al. ...................... 395/375 |
| 4,498,136 | 2/1985 | Sproul, III ..................... 395/725 |
| 4,656,578 | 4/1987 | Chilinski et al. ................ 395/375 |
| 4,709,324 | 11/1987 | Klocker ......................... 395/725 |
| 4,755,935 | 7/1988 | Davis et al. .................... 395/250 |
| 4,777,587 | 10/1988 | Case et al. ..................... 395/375 |
| 5,003,462 | 3/1991 | Blaner et al. ................... 395/375 |
| 5,119,483 | 6/1992 | Madden et al. ................... 395/375 |
| 5,150,469 | 9/1992 | Jouppi .......................... 395/375 |
| 5,185,871 | 2/1993 | Frey et al. ..................... 395/375 |

FOREIGN PATENT DOCUMENTS

| 0198214A2 | 10/1986 | European Pat. Off. . |
| 0208181A1 | 1/1987 | European Pat. Off. . |
| 2075023 | 6/1990 | Japan . |

OTHER PUBLICATIONS

Hewlett-Packard Journal, vol. 37, No. 8, Aug. 1986, Palo Alto, CA, USA, pp. 4–21; Mahon et al.: "Hewlett-Packard Precision Architecture: The Processor."

14th Annual International Symposium on Computer Architecture, 2 Jun. 1987 Pittsburgh, PA, USA, pp. 10–16, Derosa and Levy: "An Evaluation of Branch architectures."

Primary Examiner—Kevin J. Teska
Assistant Examiner—Ayni Mohamed
Attorney, Agent, or Firm—Limbach & Limbach LLP

[57] ABSTRACT

A processing method by a processor operating under a pipeline control mode, in which first instruction information data are fetched in a first operating cycle of a series of operating cycles and processing in accordance with the first instruction information data is executed in the following second operating cycle, at the same time that second instruction information data is fetched. When an interrupt demand is made in a given operating cycle, address data of Instruction information data fetched during the operating cycle and address data of instruction information data fetched during an operating cycle following the operating cycle are saved. Instruction information data specified by the two address data are fetched and executed on termination of an interrupt processing performed in response to the interrupt demand.

5 Claims, 5 Drawing Sheets

METHOD AND PROCESSOR FOR RELIABLY PROCESSING INTERRUPT DEMANDS IN A PIPELINE PROCESSOR

This is a continuation of application Ser. No. 07/706,936, filed on May 29, 1991, and now abandoned.

BACKGROUND OF THE INVENTION

1. Field of the Invention

This invention relates to a processing method by a pipeline control mode processor in which first instruction data are fetched during a first cycle and in which processing is executed on the basis of the first instruction data and second instruction data are fetched during the ensuing second cycle.

2. Description of the Prior Art

There have been heretofore extensively presented digital computers operating under the von Neumann type stored program system. With this type of the digital computers, the machine language instruction information data stored in a program storage section is selectively fetched by a sequencer and data processing is executed in accordance with the thus fetched instruction information data.

In general, in an assembler level conditional branching in a processor of a digital computer, there are required two different instructions, that is the conditional judgment instruction [CMP A, B], such as CMP A, B and the branching instruction [JMP(Z)****], such as JMP(Z) LABEL. The branching instruction gives a judgment on branching on the basis of the immediately preceding status of the processor. Since the branching itself is an instruction, at, least two instructions are necessitated.

When performing the conditional branching in the conventional digital computer, the data of the conditional judgment, instruction [CMP A, B] information (in the form of machine language instruction information data stored in the program storage section) is fetched and decoded by the sequencer. The operating section then gives a judgment on the condition in accordance with the judgment instruction [CMP, A, B] information and sets a flag, for example, indicating the result of judgment in a predetermined register. This terminates the processing for executing the conditional judgment instruction [CMP, A, B].

The sequencer then fetches and decodes the branching instruction [JMP(Z)****] (in the form of machine language instruction information data from the program storage section). The sequencer then makes a judgment, as to branching based on the flag set in the register and executes the processing for branching.

With the above described conventional digital computer, two instructions, namely the conditional judgment, instruction [CMP A, B] and branching instruction [JMP(Z)****], need to be provided and executed step by step by way of performing the processing for conditional branching.

On the other hand, in a processor of the pipeline type of the digital computer, the processing operation is divided into plural sections and processing for these sections is performed continuously in parallel similarly to an assembly line operation in accordance with a pipeline control mode to enable high speed processing.

For example, in a processor provided with two pipelines, when processing a series of instruction [1], [2], [3], . . . stating a predetermined program, as shown in FIG. 1 , the operation of fetching the data [1], [2], [3], . . . and the operation of executing processing in accordance with the fetched data [1], [2], [3], . . . are performed in parallel.

Meanwhile, when the following branching processing program

|       | move | 3, r$\emptyset$ | [1] |
|       | jmp  | label | [2] |
|       | move | r$\emptyset$, r1 | [3] |
| label: | move | 3, r$\emptyset$ | [A] |
|       | move | 1, r$\emptyset$ | [B] | is executed on a processor having the two pipelines, the jump instruction [2] is executed during the time the instruction [3] following the jump instruction [2] is fetched, as shown in FIG. 2, such that, after the instruction [3] data, the instruction [A] data, specified by the label contained in the jump instruction [2] data, are fetched. Meanwhile, the instruction [3] data, next to the jump [2] data, is handled as what is called hop, for which no operation is performed.

Now suppose that, in the above described processor provided with the two pipelines, an interrupt demand is accepted and an interrupt is to be executed. If, with the instruction sequence of the interrupt service routine of [i$_1$], [i$_2$], [i$_3$], . . . the interrupt demand is made during execution of the instruction [2], as shown at FIG. 3A, the interrupt demand is accepted after execution of the instruction [2]. During the operating cycle in which the interrupt demand has been accepted, the address information of the instruction data of the interrupt service routine is read from a predetermined memory, while the return address data to the instruction [3] data fetched during the cycle of executing the instruction [2] is transiently saved or pushed in a stack register. From the next cycle on, the instruction [i$_1$], [i$_2$], [i$_3$], . . . data of the interrupt service routine is fetched and executed. When returning from the interrupt service routine, the return instruction [ret] data are fetched once and the return adders data to the instruction [3] data are popped from the stack register during the cycle of execution of the return instruction [ret], as shown at in FIG. 3B. The instruction [3] data, as indicated by the address data, is fetched and executed.

With the conventional processor, operating in accordance with the above described pipeline control mode, should an interrupt demand be made during the execute cycle of the jump instruction [2], as shown in FIG. 3A, the return address data to the instruction [3] data fetched during the execute cycle of the jump instruction [2] is pushed into the stack register. Therefore, when returning from the interrupt service routine, the instruction [3] data is fetched and executed, based on the return address data to the instruction [3] data popped from the stack register, as shown in FIG. 3B, so that the jump instruction [2] data is disregarded as a practical matter. Thus the interrupt demand cannot be accepted during execution of the jump instruction data.

Meanwhile, in a virtual memory system with a processor operating under a pipeline control mode, should a so-called page fault occur during fetching of instruction data and hence an interrupt demand raised, it is necessary to accept the interrupt demand at the time point of termination of the execute cycle in accordance with instruction data fetched during the fetch cycle preceding the fetch cycle of the above mentioned instruction data before processing to execution of the interrupt service routine for page fault processing. However, if the instruction executed at the time of page fault occurrence is the jump instruction data, the interrupt demand cannot be accepted, as explained hereinabove. For this reason, it becomes impossible to proceed to the page fault processing.

OBJECT AND SUMMARY OF THE INVENTION

In view of the above described status of the art of interrupt processing in a conventional processor operating under the pipeline control mode, it is an object of the present invention to enable a faster and reliable interrupt processing in a processor operating in accordance with the pipeline control mode.

It is another object of the present invention to enable a processing in connection with page fault to be executed by an interrupt processing in a virtual memory system with a processor operating in accordance with the pipeline control mode.

In accordance with the present invention, there is provided a processing method for a processor operating under a pipeline control mode in which first instruction information data are fetched in a first operating cycle of a series of operating cycles and processing in accordance with the first instruction information data is executed in the following second operating cycle, at the same time that second instruction information data is fetched. In the present invention, when an interrupt demand is made in a given operating cycle in the course of the series of operating cycles, address data of instruction information data fetched during the operating cycle and address data of instruction information data fetched during the next operating cycle are saved. Instruction information data specified by the two address data are fetched and executed on termination of interrupt processing performed in response to the interrupt demand.

With the processing method by a processor according to the presents invention, should an interrupt demand be made in a given operating cycle of a series of operating cycles, address data of instruction information data fetched during this operating cycle and address data of instruction information data fetched during an operating cycle following the firstly mentioned operating cycle are saved. On termination of the interrupt processing made in response to the interrupt demand, the instruction information data specified by the two address data are fetched and executed. Thus it becomes possible to accept the interrupt demand even during execution of the jump instruction to perform the interrupt processing reliably.

Hence, it becomes possible with the present invention to perform a processing for page fault in a virtual memory system with a processor operating under a pipeline control mode reliably and at an elevated processing speed.

BRIEF DESCRIPTION OF THE DRAWINGS

Figures 1, 2:
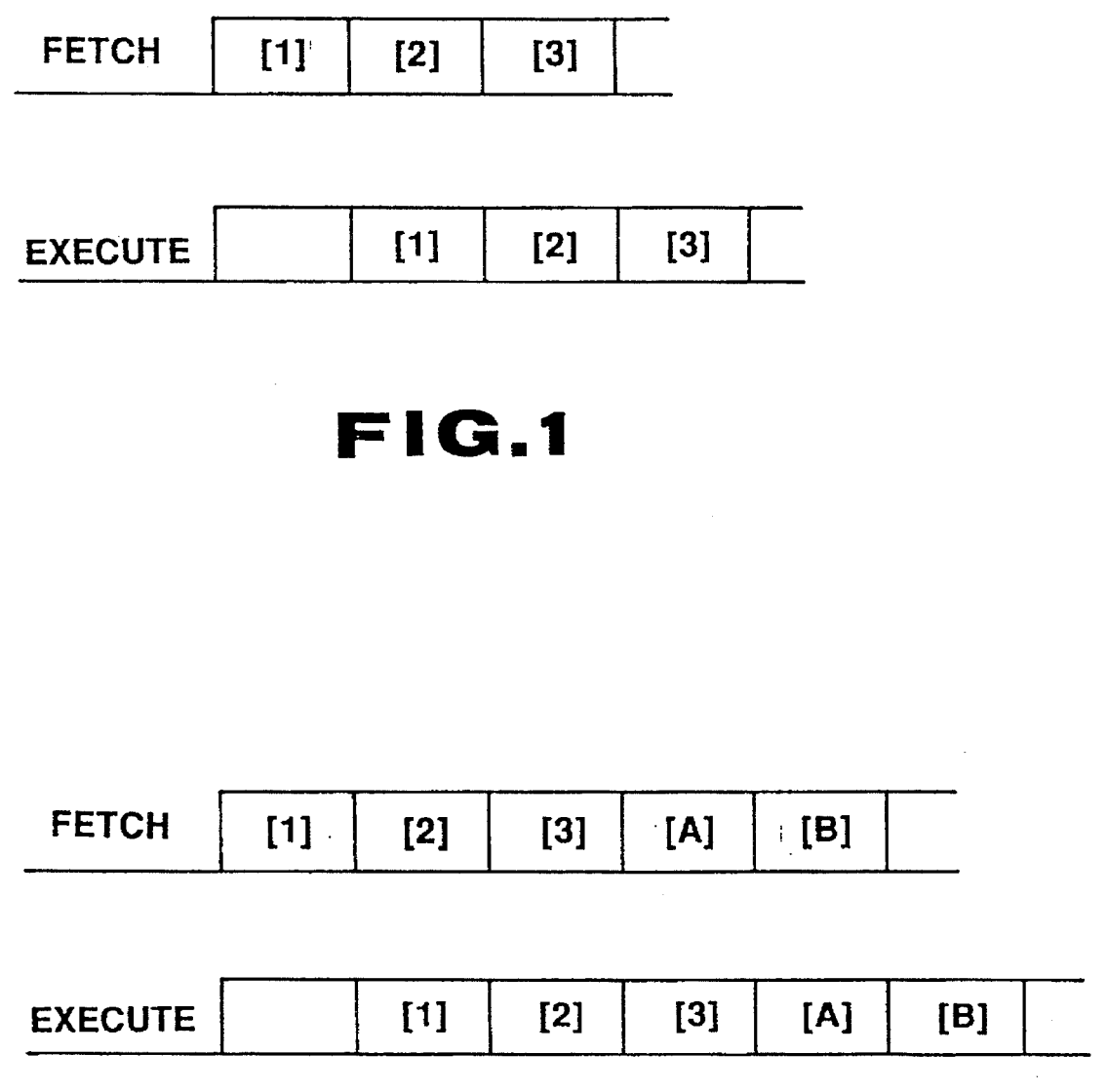

FIG. 1 is a timing chart for illustrating a processing process by a processor operating under a conventional pipeline control mode.

FIG. 2 is a timing chart for illustrating a processing process during execution of a branching processing program.

DETAILED DESCRIPTION OF PREFERRED EMBODIMENT

Figure 3:
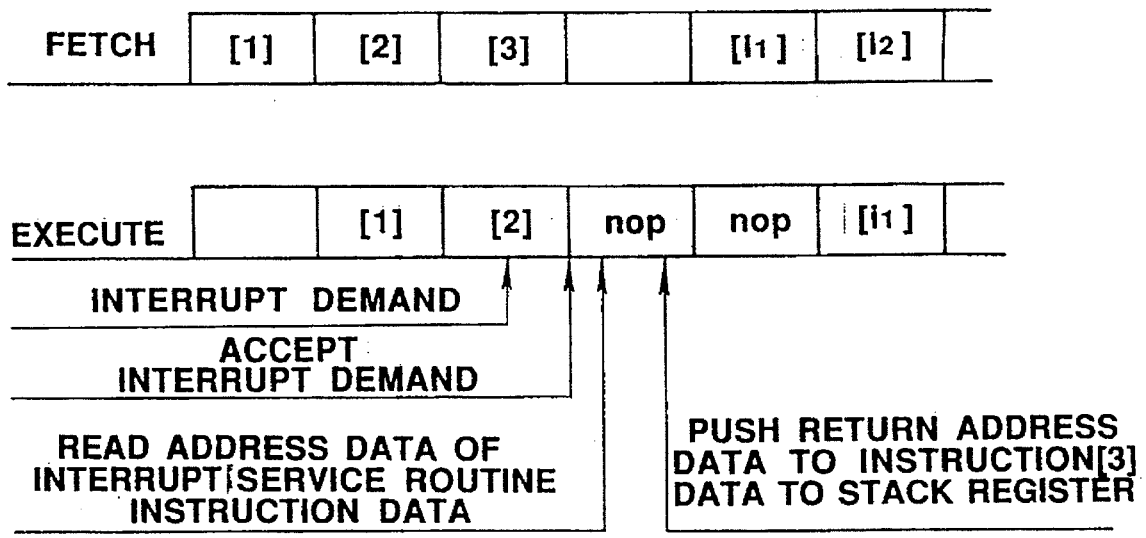
FIG. 3A is a timing chart for illustrating a processing process when starting an interrupt processing when an interrupt demand is accepted during execution of the branching processing program.
FIG. 3B is a timing chart for illustrating a processing process when terminating an interrupt processing.
Figure 3:
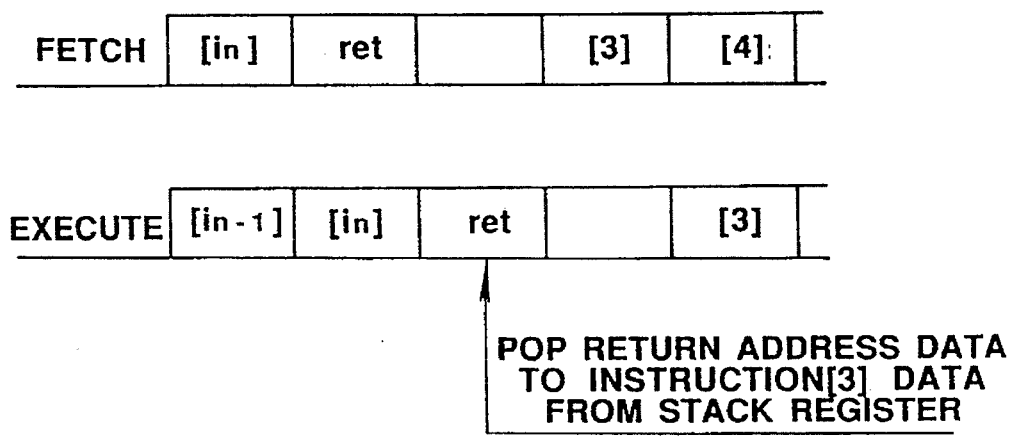
Figure 4:
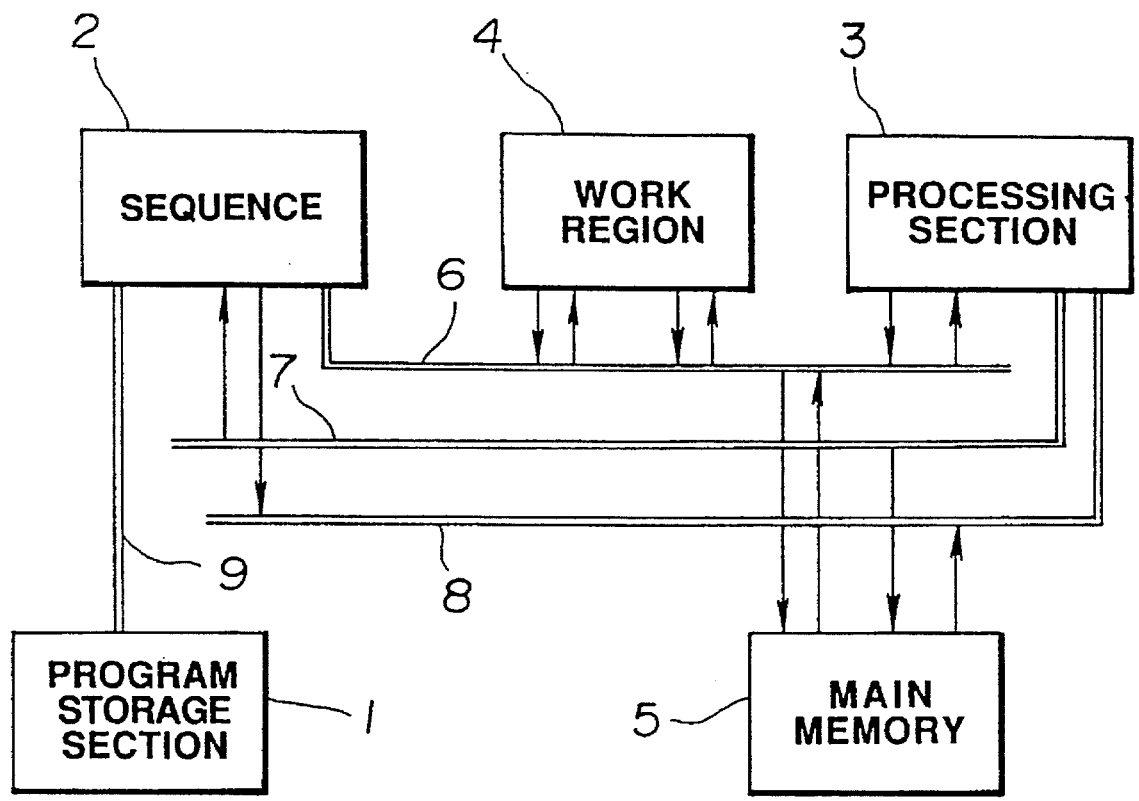
FIG. 4 is a block diagram showing the function and construction of a processor used for practicing the processing method of the present invention.

The method of the present invention is carried out by a processor shown in FIG. 4. As shown therein the processor is constituted by a program storage section 1 for accumulating machine language instruction data, a sequencer 2 for fetching the machine language data from the program storage section 1, to execute a variety of control operations, such as data transfer control operations, a processing section 3 for performing arithmetic or logical operations in accordance with control data conforming to the instruction data fetched by the sequencer 2, a work region 4 for transient storage of interim data during processing, a main storage section 5 for storing data necessary for processing or processed data, and bus lines 6, 7 and 8 interconnecting these sections.

With the above described processor operating under the pipeline control mode, the program storage section 1 and the sequencer 2 are connected to each other by means of a bus line 9 adapted for transmitting independent instruction data. Thus, from the machine language instruction data stored in the program storage section 1, the first instruction data is fetched by the sequencer 2 during the first cycle. Processing is executed during the next second cycle on the basis of the first instruction data, and at the same time the second information data is fetched.

Figure 5:
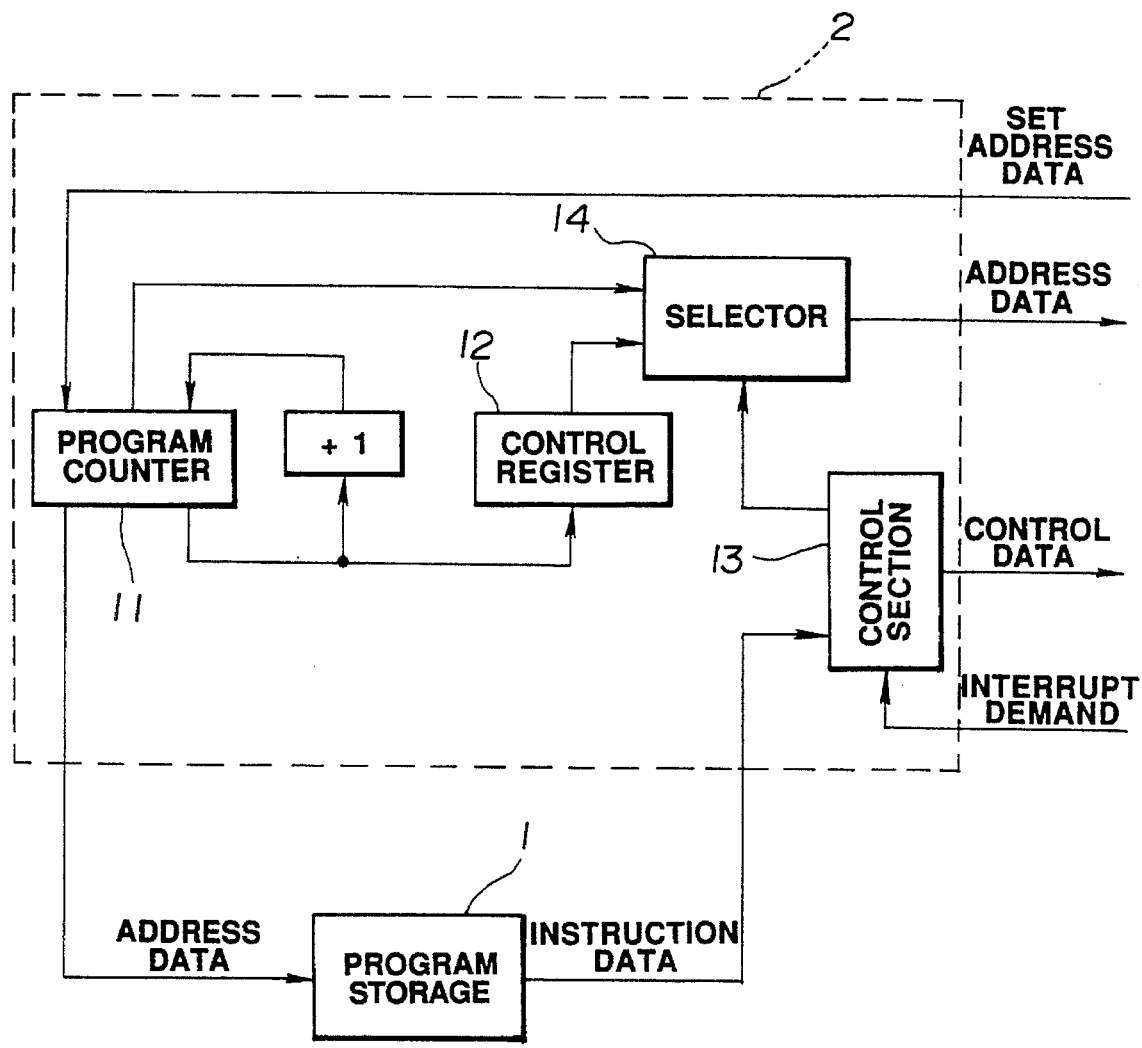
FIG. 5 is a block diagram showing essential components of a sequencer provided in the processor shown in FIG. 4.

Referring to FIG. 5, showing the main part of the sequencer 2, the sequencer is constituted by a program counter 11, incremented at each operating cycle, a control register 12 holding program address data generated in the program counter 11 during one operating cycle, a control section 13 (control section 13 is sometimes referred to hereinafter as processor 13) for decoding instruction data read out from the program storage section 1 by address data generated by the program counter 11 and outputting control data conforming to the instruction data, and a selector 14 controlled by the output from said processor 13 for selecting the address data generated by the program counter 11 or the address data outputted from the control register 12. Meanwhile, the program address can be compulsorily set in the program counter 11, while an interrupt demand can be accepted by the processor 13.

Figure 6A:
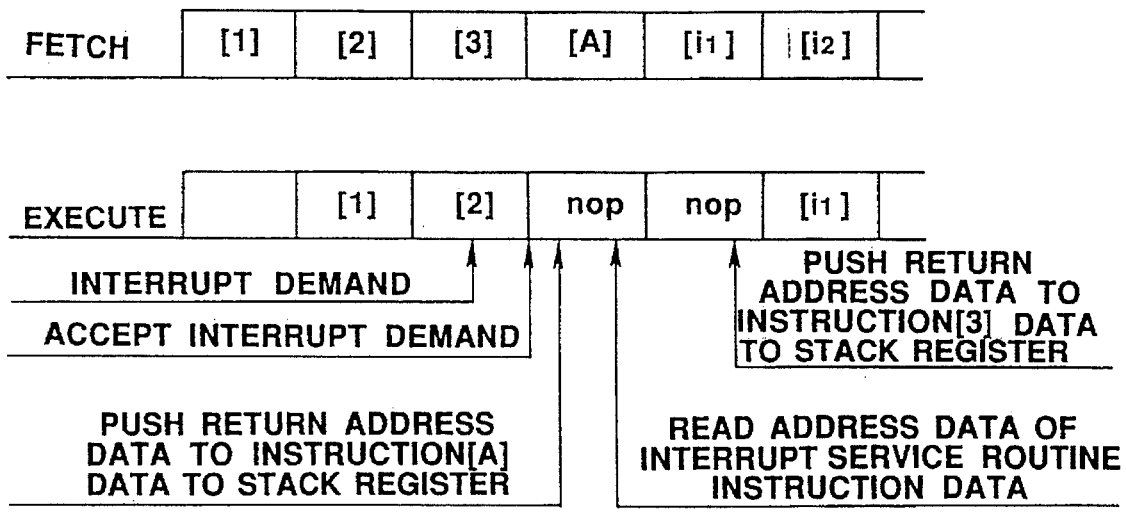
FIG. 6A is a timing chart for illustrating a processing process when starting an interrupt processing in the processing method of the present invention.

Referring to FIG. 6A, if an interrupt demand is made during the execution cycle of, for example, an instruction [2] of a series of operating cycles, the processor 13 of the sequencer 2 accepts the interrupt demand at the time point of termination of the instruction [2]. During the execution cycle which has accepted the interrupt demand, the processor 13 controls the selector 14 to select the program counter 11 and pushes the address data of the instruction [A] information fetched during this execution cycle into the stack register in the work area 4 as the return address data. The processor 13 then reads the address data of the interrupt service routine from the work area 4 and proceeds to compulsory setting of the program address in the program counter 11, with the address information as the set address information.

It is noted that flags or interrupt level data, for example, are pushed into the stack register of the work region 4 simultaneously with the return address data.

As from the cycle following the execute cycle which has accepted the interrupt demand, the processor 13 fetches and executes interrupt service routine instructions $[i_1]$, $[i_2]$, $[i_3]$, ... During the execute cycle following the execution cycle which has accepted the interrupt demand, that is the execute cycle corresponding to the fetch cycle which has fetched the instruction $[i_1]$ information, the processor 13 controls the selector 14 to select the control register 12 transiently to push the address data of the instruction [3] information (fetched during the execute cycle which has accepted the interrupt demand during execution of the instruction [2]) into the stack register in the work area 4 as the return address.

Figure 6B:
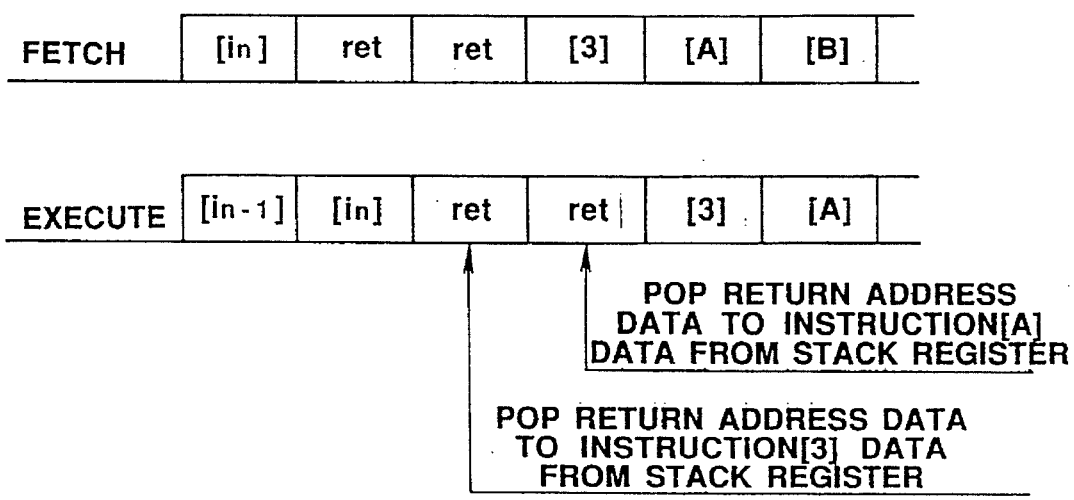
FIG. 6B is a timing chart for illustrating the processing process when terminating an interrupt processing.

On termination of the interrupt processing which has been performed in response to the interrupt demand, the return instruction [ret] information is fetched twice, as shown in FIG. 6B. During the execute cycle of the first instruction [ret], the address data of the instruction [3] is popped from the stack region in the work region 4. Thus, during the cycle following the cycle of the first instruction [ret] information, the address information of the instruction [3] information is fetched and, during the next following execution cycle, the instruction [3] is executed.

During the execute cycle of the second instruction [ret], the address data of the instruction [A] information is popped from the stack register in the work region 4. Thus, during the cycle following the execute cycle of the second instruction [ret], the addFess data of the instruction [A] information is fetched and, during the next following execute cycle, the instruction [A] is executed.

Thus, in the present embodiment, should an interrupt demand be made in the course of a given operating cycle of a series of operating cycles, the address data of the instruction [3] information which has been fetched during this operating cycle and the address data of the instruction [A] information to be fetched in the course of the cycle next to the above mentioned operating cycle are stored in the reverse order in the stack register of the work area 4 as the return address data.

On termination of the interrupt processing performed responsive to the interrupt demand, the instruction [3] information and the instruction [A] information, specified by the return address data popped sequentially from the stack register in the work region 4, are sequentially fetched and executed.

By the above described sequence of the processing operations, it becomes possible to accept the interrupt demand, to perform the interrupt processing and to return to the original processing program reliably after termination of the interrupt processing.

In the above embodiment, if a processing corresponding to the jump processing program explained hereinabove in connection with the status of the art, with the instruction [2] information as the jump instruction information, and if an interrupt demand is made during the execute cycle of the jump instruction [2], the return address data to the instruction [3] information fetched during the execute cycle of the jump instruction [2] and the return address data to the instruction [A] information specified by the label afforded to the jump instruction [2] are stored in the stack register in the work region 4. When returning from the interrupt service routine, the instruction [3] information and the instruction [A] information, popped from the stack register are sequentially fetched and executed, so that the jump instruction [2] may be executed reliably.

Meanwhile, in the present embodiment, the instruction [3] information, following the jump instruction [2] information, is handled as the NOP information.

It is noted that, in the present embodiment, should a further interrupt demand be made on termination of an interrupt processing executed responsive to an interrupt demand, the interrupt processing for the further demand may be executed by the similar sequence of operations.

In an embodiment to follow, it is intended to elevate the data processing speed in a digital computer in which the machine language instruction information stored in the program storage section is selectively fetched by a sequencer and the information data are processed in accordance with the thus fetched instruction information. At least two continuous instruction data in which the state of execution in accordance with the second instruction is controlled by the result of execution in accordance with the first instruction is executed as the unitary instruction data, as in the case of the conditional branch processing.

The second embodiment is explained hereinbelow in more detail.

In the present second embodiment, machine language instruction data are selectively fetched by a sequencer and data processing is executed in accordance with the thus fetched instruction data. The basic structure of the present second embodiment is shown in FIG. 4.

In this figure, the program storage section 1 stores the machine language instruction data stating a program adapted for performing a predetermined processing. In the case of at least two consecutive instruction data in which the state of execution in accordance with the second instruction is controlled by the result of execution in accordance with the first instruction, as in conditional branching, these two consecutive instruction information data are stored as the unitary instruction information data. That is, in the case of conditional branching, the instruction such as JMP(Z)** (CMP A, B) is set in a field of an assembler or a microprogram to state both the conditional judgment and branching. Thus the conditional judgment instruction [CMP A, B] and the jump instruction [JMP(Z)] are stored as unitary instruction information data, that is, the conditional jump instruction [JMP(Z)**(CMP A, B)] instruction, in the program storage section 1.

The sequencer 2 fetches the machine language instruction information data from the program storage section 1 and decodes the instruction information data to control the processing section 3.

When the two consecutive instruction information data are fetched as the unitary instruction information data, such as the above mentioned conditional jump instruction [JMP(Z)**(CMP A, B)] information data, from the program storage section 1, the sequencer 2 causes the processing section 3 to execute processing in accordance with the conditional judgment instruction [CMP A, B] in the above conditional jump instruction [JMP(Z)(CMP A, B)], at the same time that it starts to execute the jump instruction [JMP(Z)]. That is, the sequencer 2 makes a judgment on branching to execute the jump instruction [JMP(Z)**] on the basis of the results of processing currently performed in the processing section 3 and transmitted immediately over signal line 9, and thus without utilizing the results of processing by the processing section 3 subsequently stored in a predetermined register in the work region 4.

Thus, in the present embodiment, the sequencer 2 handles at least two consecutive instruction information data, in which the state of execution in accordance with the second instruction data is control led by the results of execution in accordance with the first instruction data, as in the case of conditional branching, as the unitary instruction information data, and executes the first and second instruction data within a single instruction cycle thereby increasing the speed of conditional branching and hence the data processing speed.

What is claimed is:

1. A method for handling interrupt demands in a pipeline processor which operates in sequential cycles, comprising the steps of:

during a first cycle, executing a first instruction, fetching a second instruction and receiving an interrupt demand;

after the first cycle, accepting the interrupt demand;

during a second cycle, fetching a third instruction and pushing return address data of the third instruction in a stack register;

during a third cycle, fetching a first interrupt service routine instruction and pushing return address data of the second instruction in a stack register;

during the fourth cycle to the (n+4)th cycle, fetching interrupt service routine instruction from a second interrupt service routine instruction to an nth interrupt service routine instruction, and executing interrupt service routine instructions, from the first interrupt routine instruction to the nth interrupt routine instruction (where n is the number of interrupt routine instructions in the interrupt routine);

during the (n+5)th cycle, popping the return address data of the second instruction from the stack register;

during the (n+6)th cycle, fetching the second instruction and popping the return address data of the third instruction from the stack register; and during the (n+7)th cycle, executing the second instruction and fetching the third instruction.

2. A method for handling interrupt demands in a pipeline processor which operates in sequential cycles, comprising the steps of:

during a first cycle, executing a first instruction, fetching a second instruction and receiving an interrupt demand;

after the first cycle, accepting the interrupt demand;

during a second cycle, fetching a third instruction and pushing return address data of the third instruction in a stack register;

during a third cycle, fetching a first interrupt service routine instruction and pushing return address data of the second instruction in a stack register;

during the fourth cycle to the (n+4)th cycle, fetching interrupt service routine instruction from a second interrupt service routine instruction to an nth interrupt service routine instruction, and executing interrupt service routine instructions, from the first interrupt routine instruction to the nth interrupt routine instruction (where n is the number of interrupt routine instructions in the interrupt routine);

during the (n+5)th cycle, popping the return address data of the second instruction from the stack register;

during the (n+6)th cycle, fetching the second instruction and popping the return address data of the third instruction from the stack register; and during the (n+7)th cycle, executing the second instruction and fetching the third instruction;

wherein the first instruction is a jump command and the third instruction is a command specified by the jump command.

3. A processor comprising:

program storage means for storing instructions;

pipeline processing means for simultaneously fetching an instruction from the program storage means and executing an instruction previously fetched from the program storage means;

means for saving return address data; and interruption handling means for performing the following operations in the following order after an interrupt demand is made:

(a) accepting the interrupt demand;

(b) saving second instruction return address data in the means for saving return address data;

(c) after step (b), saving first instruction return address data in the means for saving return address data while causing the pipeline processing means to fetch and execute an interrupt service routine specified by the interrupt demand;

(d) retrieving first instruction return address data from the means for saving return address data; and (e) after step (d), retrieving second instruction return address data from the means for saving return address data.

4. The processor according to claim 3, wherein the means for saving return address data is a stack register.

5. The processor according to claim 3, wherein the second instruction return address data corresponds to a second instruction specified in a jump command executed prior to acceptance of the interrupt demand.

* * * * *